US006812605B2

(12) United States Patent
Tyshchuk et al.

(10) Patent No.: US 6,812,605 B2
(45) Date of Patent: Nov. 2, 2004

(54) SELF-RETAINED RFI SUPPRESSION CHOKE FOR ELECTRIC MOTOR

(75) Inventors: Sergey Tyshchuk, London (CA); John Seguin, London (CA); Alex Gubbels, Mt. Brydges (CA)

(73) Assignee: Siemens VDO Automotive Inc., Mississauga (CA)

( * ) Notice: Subject to any disclaimer, the term of this patent is extended or adjusted under 35 U.S.C. 154(b) by 154 days.

(21) Appl. No.: 10/262,175

(22) Filed: Oct. 1, 2002

(65) Prior Publication Data

US 2004/0061411 A1 Apr. 1, 2004

(51) Int. Cl.$^7$ .......................... H02K 11/02; H02K 13/00
(52) U.S. Cl. ........................ 310/68 R; 310/71; 310/72; 310/238; 336/192
(58) Field of Search ............................. 310/51, 68 R, 310/71, 72, 219, 238, 239, 248; 336/192

(56) References Cited

U.S. PATENT DOCUMENTS

| | | | |
|---|---|---|---|
| 4,600,850 A | 7/1986 | Mazzorana et al. ......... 310/242 |
| 4,727,274 A | 2/1988 | Adam et al. | |
| 4,900,966 A | 2/1990 | Winter et al. | |
| 5,196,750 A | 3/1993 | Strobl | |
| 5,231,321 A | 7/1993 | Takiguchi | |
| 5,563,462 A | 10/1996 | Strobl et al. | |
| 5,656,878 A | 8/1997 | Nakata | |
| 5,686,775 A | 11/1997 | Veil et al. | |
| 5,734,212 A | 3/1998 | Uffelman | |
| 5,747,901 A | 5/1998 | Harada et al. ................. 310/71 |
| 5,872,411 A | 2/1999 | Nakata | |
| 5,942,819 A | 8/1999 | Burgess et al. | |
| 6,104,110 A | 8/2000 | Uchida et al. | |
| 6,617,744 B2 * | 9/2003 | Kershaw et al. ............ 310/239 |
| 6,624,546 B2 * | 9/2003 | Kershaw et al. ............ 310/239 |

FOREIGN PATENT DOCUMENTS

| | | |
|---|---|---|
| FR | 2 699 338 A3 | 11/1993 |
| GB | 2 095 918 A | 10/1982 |

OTHER PUBLICATIONS

European Search Report, Date of Completion: Jan. 22, 2004.

* cited by examiner

Primary Examiner—Thanh Lam
Assistant Examiner—David W. Scheuermann

(57) ABSTRACT

A choke 20 is provided for suppressing radio-frequency interference of a brush-type motor. The choke includes a single wire having a portion wound about a coil axis A to define a plurality of coils 24 including two outermost coils 26 and 28. An attaching structure 30 extends from one of the outermost coils and includes a loop structure 42. The loop structure is constructed and arranged to be inserted into a slot 58 in a brush card 48 and moved into hooked relation with a retaining member 60 of the brush card that is associated with the slot so as secure the choke to the brush card. At least a portion of the attaching structure is constructed and arranged to be in electrical connection with a brush 56 of a motor when the choke is secured to the brush card. An elongated end portion 44 of the choke extends directly from the other of the outermost coils. The elongated end portion is constructed and arranged to be directly electrically connected to an electrical connector 54 when the choke is secured to the brush card.

5 Claims, 2 Drawing Sheets

SELF-RETAINED RFI SUPPRESSION CHOKE FOR ELECTRIC MOTOR

FIELD OF THE INVENTION

This invention relates to d.c. electric motors for automotive applications and, more particularly, to a choke having features for improved mechanical and electrical connection with components of a brush card assembly.

BACKGROUND OF THE INVENTION

Typical multi-pole automotive d.c. electric motors use bus bars to conduct current between the electrical connector of the motor and associated components such as chokes, capacitors, and brushes. Conventional bus bars have to be manufactured and physically attached, supported and connected with the motor. Typically, the bus bars are riveted to the brush card of the motor. The electrical connection is usually achieved using soldered or heat-fused joints.

Thus, there is a need to reduce the number of electrical connections required on the motor's brush card, to eliminate costly bus bars and to reduce the number of separate mechanical fasteners needed on the brush card.

Furthermore, conventionally, wound wire coils or chokes are installed close to the brushes of d.c. motors, particularly in automotive applications. The purpose of the chokes is to suppress radio-frequency interference (RFI) generated by the motor. Generally, the chokes are physically attached to the brush card of the motor using fixing or fastening techniques that require additional specific parts or processes, for example, the ends of the chokes may be soldered to conductors that are riveted to the brush card, and/or clips or other fasteners may be used to attached the chokes.

Another way of attaching chokes 10 to the brush card 12 is shown in FIG. 1. Connecting portions 14 of each choke 10 are inserted through an associated opening 16 in the brush card 12 and then the connecting portions 14 are bent to secure the choke to the brush card. Although no additional fasteners are used to attach this type of choke, additional bending steps are required which increases labor costs.

Hence, there is also a need to provide secure mechanical attachment of the choke to the brush card while avoiding the necessity specific fastening components or additional assembly procedures.

SUMMARY OF THE INVENTION

An object of the present invention is to fulfill the needs referred to above. In accordance with the principles of the present invention, this objective is obtained by providing a choke for suppressing radio-frequency interference of a brush-type motor. The choke includes a single wire having a portion wound about a coil axis to define a plurality of coils including two outermost coils. An attaching structure extends from one of the outermost coils and includes a loop structure. The loop structure is constructed and arranged to be inserted into a slot in a brush card and moved into hooked relation with a retaining member of the brush card associated with the slot, so as secure the choke to the brush card. At least a portion of the attaching structure is constructed and arranged to be in electrical connection with a brush of the brush card when the choke is secured to the brush card. An elongated end portion extends directly from the other outermost coil. The elongated end portion is constructed and arranged to be directly electrically connected to an electrical connector of the brush card when the choke is secured to the brush card.

In accordance with another aspect of the invention, a brush card assembly for a d.c. motor includes at least one choke composed of a single wire having a portion wound about a coil axis to define a plurality of coils including two outermost coils. An attaching structure extends from one of the outermost coils and includes a loop structure. An elongated end portion extends from the other of the outermost coils. A brush card has a top side and an opposing bottom side and slot through the opposing sides. The brush card includes a retaining member adjacent to the slot. The loop structure is received in the slot and is in hooked relation with the retaining member such that the choke is secured to the brush card. A brush is mounted on the brush card and is in electrical connection with at least a portion of the attaching structure. An electrical connector is mounted on the brush card and receives at least a part of the elongated end portion of the choke.

In accordance with yet another aspect of the invention, a method of connecting a choke to a brush card assembly is provided. The choke includes a single wire having a portion wound about a coil axis to define a plurality of coils including two outermost coils. An attaching structure extends from one of the outermost coils and includes a loop structure. An end portion extends from the other outermost coil. The brush card assembly includes a brush mounted on the brush card, and an electrical connector mounted on the brush card. In the method, the loop structure is inserted into the slot of the brush card and is moved into hooked relation with the retaining member of the brush card, thereby securing the choke to the brush card. The elongated end portion is electrically connected to the connector. A portion of the attaching structure is electrically connected to the brush.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

DETAILED DESCRIPTION OF THE INVENTION

Figure 2:
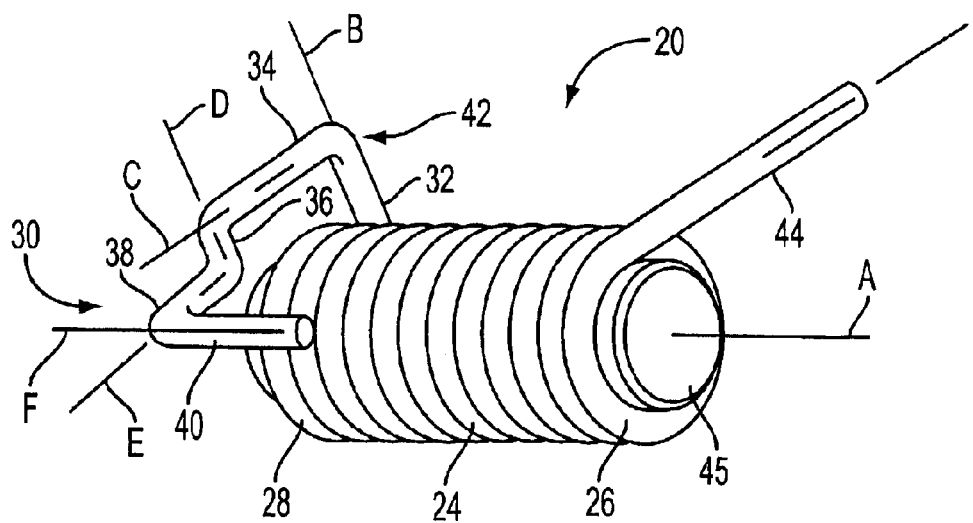
FIG. 2 is an enlarged perspective view of a choke for a d.c. motor, provided in accordance with the principles of the present invention.

Referring to FIG. 2, a choke, generally indicated 20, for suppressing radio-frequency interference of a brush-type, multi-pole d.c. motor, is shown in accordance with the principles of the invention. The choke 20 comprises a single conductive wire having a coil portion wound about a coil axis A to define a plurality of coils 24 including two outermost coils, 26 and 28. The choke 20 includes an attaching structure, generally indicated at 30, extending from the outermost coil 28. The attaching structure 30 is defined by a plurality of bends in one end of the choke 20 and includes a first portion 32 extending from the outermost coil 28 and having an axis B generally transverse to the coil axis A. A second portion 34 has an axis C generally transverse with respect to the axis B of the first portion 32 and is spaced from the coil axis A. A third portion 36 has an axis D generally parallel with the axis B of the first portion 32. A fourth portion 38 has an axis E generally parallel with the axis C of the second portion 34. An ending portion 40 has an axis F generally transverse to the axis E of the fourth portion 38. The first, second and third portions define a loop structure, generally indicated at 42, the function of which will be explained below. In the illustrated embodiment, a ferrite core 45 is provided inside the coil 24.

An elongated end portion 44 extends from the other outermost coil 26 so as to be generally transverse to the coil axis A. In the illustrated embodiment, the elongated end portion 44 is preferably straight and is constructed and arranged to be directly electrically connected to an electrical connector of the motor when the choke 20 is secured to a brush card. It can be appreciated that the elongated end portion can include bends therein to accommodate mounting to a connector of the brush card.

Figure 3:
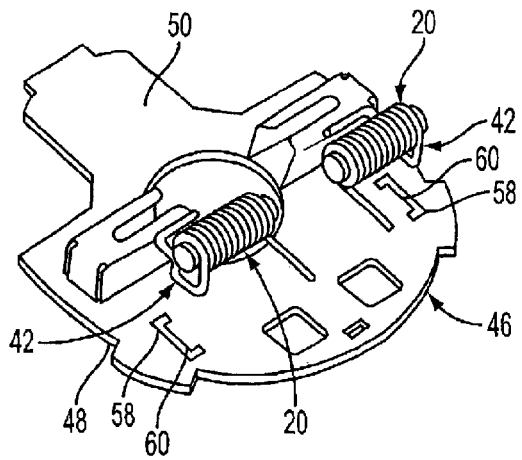
FIG. 3 is view of a front of a brush card assembly of the invention showing a pair of chokes disposed above the brush card and ready to be mounted thereto.
Figure 4:
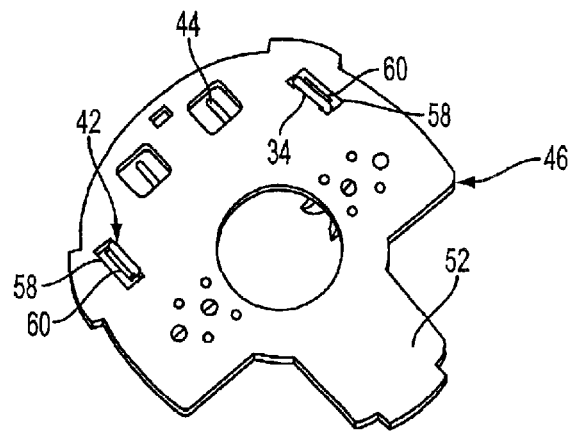
FIG. 4 is a view of the bottom side of brush card assembly of the invention showing loop structure of the chokes hooked over a retaining member of the brush card to secure the chokes to the brush card.
Figure 5:
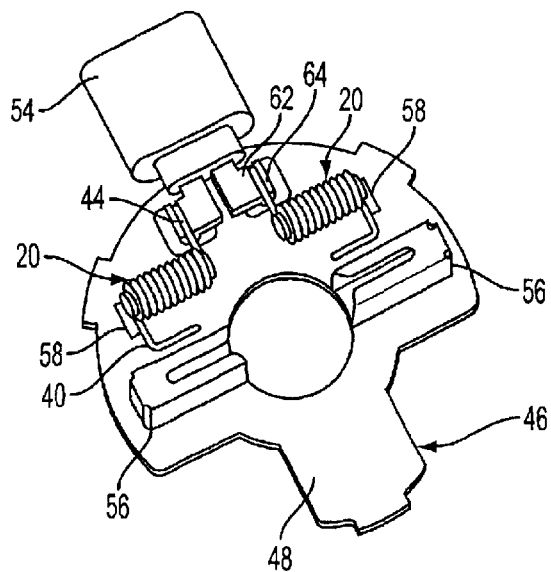
FIG. 5 is view of a top side of the brush card assembly of the invention showing a pair of chokes coupled thereto and coupled with an electrical connector.

FIGS. 3–5 show the connection of chokes 20 of FIG. 2 to a brush card assembly, generally indicated at 46. The brush card assembly 46 includes a brush card 48 having a top side 50 and an opposing bottom side 52 (FIG. 4). As shown in FIG. 5, an electrical connector 54 and brushes 56 are mounted to the brush card 48. The brush card 48 includes a slot 58 there-through associated with each choke 20. A retaining member 60 of the brush card 48 protrudes into the slot 58. A width of the retaining member 60 is less than the width of the loop structure 42 of the choke 20. Thus, to secure the choke 20 to the brush card, the loop structure 42 of the choke 20 is inserted into the slot 58 and moved into hooked relation with the retaining member 60 of the brush card 48 (FIG. 4). Thus, portion 34 of the loop structure 42 of each choke 20 is disposed on the bottom side 52 of the brush card 28 with the coils 24 being disposed on the top side 50 of the brush card 48.

As best shown in FIG. 5, the elongated end portion 44 of each choke 20 is coupled to a terminal 62 of the connector 54. In particular, the terminal 62 defines an open channel 64 that receives at least a part of the end portion 44. In addition, the ending portion 40 of each choke 20 is electrically coupled to a brush shunt wire (not shown) so as to be electrically connected to a brush. The use of elongated end portion 44 and ending portion 40 of the choke 20 reduces the number of electrical connections required on the brush card 48, eliminates the costly manufactured bus bars, and reduces the number of separate mechanical fasteners need on the brush card.

Figure 1:
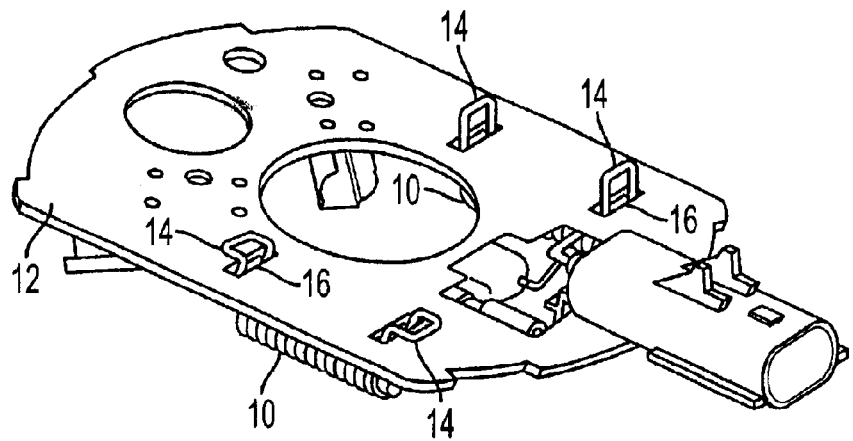
FIG. 1 is a perspective rear view of a brush card of a d.c. motor showing conventional cokes attached thereto by bending connecting portions of the chokes.

The use of the attaching structure 30 with the loop structure 42 avoids the need for separate choke fastening components and provides a simple attachment of the chokes. Since there is no bending of connection portions 14 as in FIG. 1, labor and thus assembly costs are reduced.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A choke for suppressing radio-frequency interference of a brush-type motor, the choke comprising:

a single wire having a portion wound about a coil axis to define a plurality of coils including two outermost coils, an attaching structure extending from one of the outermost coils and including a loop structure, the loop structure being constructed and arranged to be inserted into a slot in a brush card and moved into hooked relation with a retaining member of the brush card that is associated with the slot so as secure the choke to the brush card, at least a portion of the attaching structure being constructed and arranged to be in electrical connection with a brush of the brush card when the choke is secured to the brush card, and an elongated end portion extending directly from the other of the outermost coils, the elongated end portion being constructed and arranged to be directly electrically connected to an electrical connector of the brush card when the choke is secured to the brush card.

2. The choke of claim 1, wherein the attaching structure is defined by a plurality of bends in one end of the choke and includes a first portion extending from the one outermost coil and having an axis generally transverse to the coil axis, a second portion having an axis generally transverse with respect to the axis of the first portion and spaced from the coil axis, a third portion having an axis generally parallel with the axis of the first portion, a fourth portion having an axis generally parallel with the axis of the second portion, and a ending portion having an axis generally transverse to the axis of the fourth portion, the first, second and third portions defining the loop structure.

3. The choke of claim 1, wherein the elongated end portion extends generally transverse with respect to the coil axis.

4. The choke of claim 1, in combination with a core received inside an opening defined by the coils.

5. The choke of claim 1, wherein the elongated portion is a straight portion.

* * * * *